United States Patent
Kim et al.

(10) Patent No.: US 12,461,142 B2
(45) Date of Patent: Nov. 4, 2025

(54) SEMICONDUCTOR WAFER TEST SYSTEM FOR CONTROLLING SUPPLY OF POWER TO SEMICONDUCTOR WAFER TEST APPARATUS AND METHOD OF CONTROLLING SUPPLY OF POWER TO SEMICONDUCTOR WAFER TEST APPARATUS

(71) Applicant: YC Corporation, Seongnam-si (KR)

(72) Inventors: Yong Hyun Kim, Seoul (KR); Jae Hoon Joo, Yongin-si (KR); Hyo Sang Jo, Uiwang-si (KR); Ki Young Jeon, Yongin-si (KR)

(73) Assignee: YC Corporation, Gyeonggi-do (KR)

( * ) Notice: Subject to any disclaimer, the term of this patent is extended or adjusted under 35 U.S.C. 154(b) by 212 days.

(21) Appl. No.: 18/333,209

(22) Filed: Jun. 12, 2023

(65) Prior Publication Data
US 2023/0417824 A1   Dec. 28, 2023

(30) Foreign Application Priority Data
Jun. 23, 2022   (KR) .......................... 10-2022-0076861

(51) Int. Cl.
*G01R 31/28* (2006.01)
(52) U.S. Cl.
CPC ................. *G01R 31/2851* (2013.01)
(58) Field of Classification Search
CPC ............ G01R 31/2851; G01R 31/2868; G01R 31/2874; G01R 31/2834; G01R 13/0254; G01R 31/287; G01R 31/31908; G01R 31/31903; G06F 11/2733
See application file for complete search history.

(56) References Cited

U.S. PATENT DOCUMENTS

| | | | | |
|---|---|---|---|---|
| 5,614,837 A | * | 3/1997 | Itoyama | G01R 31/2849 324/750.16 |
| 5,750,908 A | * | 5/1998 | Drohan | G01M 99/00 700/121 |
| 6,532,559 B1 | * | 3/2003 | Pham | G01R 31/2851 324/763.01 |

(Continued)

FOREIGN PATENT DOCUMENTS

| | | |
|---|---|---|
| JP | 2010-101644 A | 5/2010 |
| KR | 20120047822 A | 5/2012 |
| KR | 10-2014-0123492 A | 10/2014 |

*Primary Examiner* — Vinh P Nguyen
(74) *Attorney, Agent, or Firm* — Harness, Dickey & Pierce, P.L.C.

(57) ABSTRACT

A semiconductor wafer test system for controlling the supply of power to a semiconductor wafer test apparatus is provided. The semiconductor wafer test system includes a test operating server and the semiconductor wafer test apparatus. The test operating server manages a wafer test schedule and allocates lots to a prober, which loads wafers into the semiconductor wafer test apparatus, in accordance with the wafer test schedule. The test operating server sends a mode switch request to the semiconductor wafer test apparatus in accordance with the wafer test schedule, and the semiconductor wafer test apparatus is switched to a waiting mode in response to receipt of a request to switch to the waiting mode from the test operating server, and is switched to a ready mode in response to receipt of a request to switch to the ready mode from the test operating server.

18 Claims, 6 Drawing Sheets

(56) References Cited

U.S. PATENT DOCUMENTS

| | | | |
|---|---|---|---|
| 6,546,525 B2 | 4/2003 | Sugimoto et al. | |
| 6,657,455 B2* | 12/2003 | Eldridge | G01R 31/31721 |
| | | | 324/756.07 |
| 7,730,248 B2* | 6/2010 | Goss | G06F 1/3296 |
| | | | 710/261 |
| 9,066,295 B2* | 6/2015 | Moeglein | H04W 52/0229 |
| 11,016,121 B2* | 5/2021 | Beng | G01R 1/025 |
| 2002/0007479 A1 | 1/2002 | Sugimoto et al. | |
| 2010/0097130 A1 | 4/2010 | Kanamaru et al. | |
| 2012/0146416 A1* | 6/2012 | Ishida | G01R 31/31924 |
| | | | 307/44 |

* cited by examiner

SEMICONDUCTOR WAFER TEST SYSTEM FOR CONTROLLING SUPPLY OF POWER TO SEMICONDUCTOR WAFER TEST APPARATUS AND METHOD OF CONTROLLING SUPPLY OF POWER TO SEMICONDUCTOR WAFER TEST APPARATUS

CROSS-REFERENCE TO RELATED APPLICATION

This application claims priority from Korean Patent Application No. 10-2022-0076861 filed on Jun. 23, 2022 in the Korean Intellectual Property Office, and all the benefits accruing therefrom under 35 U.S.C. 119, the contents of which in its entirety are herein incorporated by reference.

BACKGROUND

1. Field

The present disclosure relates to a method of controlling the supply of power to a semiconductor wafer test apparatus and a semiconductor wafer test system including a server and a semiconductor wafer test apparatus.

2. Description of the Related Art

A semiconductor wafer test apparatus, also referred to as automatic test equipment (ATE), is an apparatus for testing a semiconductor wafer by applying electrical test signals to the semiconductor wafer and analyzing a response from the semiconductor wafer.

When initial power is supplied to the semiconductor wafer test apparatus, the semiconductor wafer test apparatus is switched from a power-off mode to a ready mode so that alternating current (AC) power and direct current (DC) power may be supplied to the elements of the semiconductor wafer test apparatus.

Figure 1:
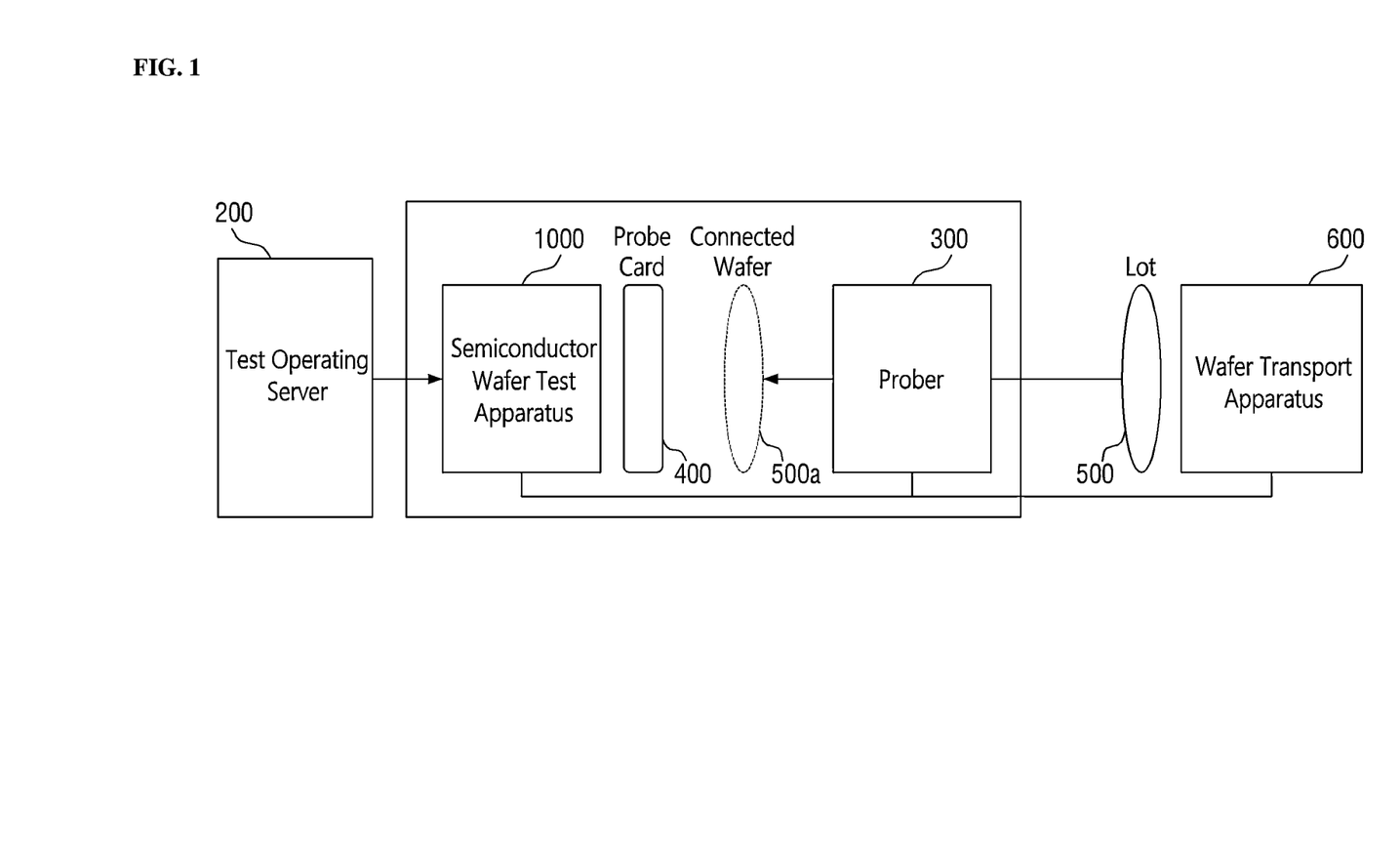
FIG. 1 is a block diagram of a typical semiconductor wafer test system.

FIG. 1 is a block diagram of a semiconductor wafer test system according to an embodiment of the present disclosure. Referring to FIG. 1, a lot 500 may include a plurality of wafers, and reference numeral "500a" refers to one of the wafers.

The semiconductor wafer test system may include a semiconductor wafer test apparatus 1000, which transmits an electrical signal to a target wafer 500a connected to a probe card 400 and determines whether the target wafer 500a is defective, the probe card 400, which establishes a connection for the transmission of signals between the target wafer 500a and the semiconductor wafer test apparatus 1000, a prober 300, which receives the target wafer 500a from a wafer transport apparatus 600 and connects the probe card 400 and the target wafer 500a, and the wafer transport apparatus 600, which provides the lot 500 to the prober 300 for a semiconductor wafer test, and may further include a test operating server 200, which manages processes performed by, and the schedule of, the semiconductor wafer test system. The prober 300 may include the probe card 400.

Figure 2:
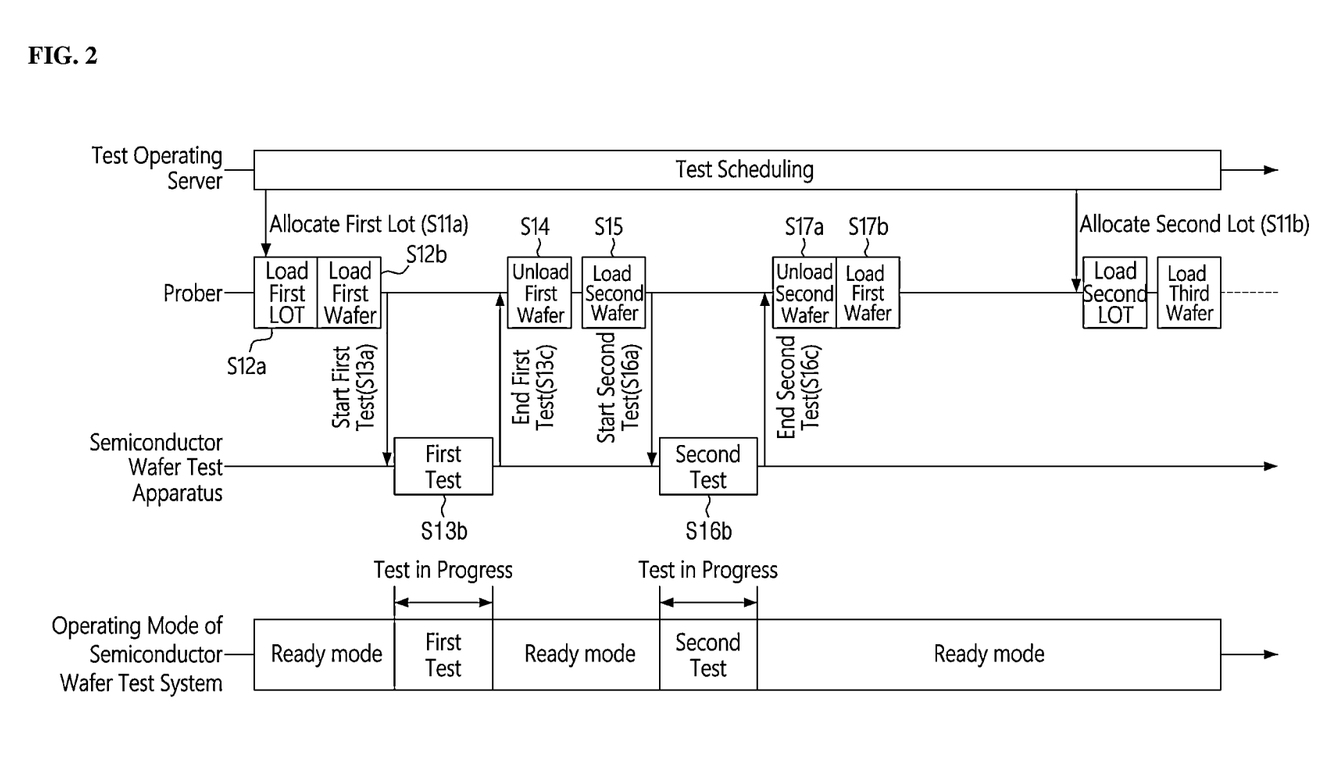
FIG. 2 is a flowchart illustrating a wafer test method of a semiconductor wafer test apparatus of FIG. 1.

FIG. 2 is a flowchart illustrating a wafer test method performed by the test apparatus 100.

Referring to FIG. 2, the test operating server 200 sequentially allocates lots to the prober 300 in accordance with a predetermined wafer test schedule. For example, the test operating server 200 may allocate first and second lots to the prober 300 (S11a and S11b). It is assumed that the first lot includes two wafers, i.e., first and second wafers, and the second lot includes two wafers, i.e., third and fourth wafers.

Thereafter, in response to the first wafer being loaded by the prober, a first test start signal may be transmitted from the prober 300 to the semiconductor wafer test apparatus 1000 (S13a). In response to receipt of the first test start signal, the semiconductor wafer test apparatus 1000 conducts a first test (S13b). When the first test is complete, the semiconductor wafer test apparatus 1000 transmits a test end signal to the prober 300 (S13c). In response to receipt of the test end signal, the prober 300 unloads the first wafer (S14) and then readily loads the second wafer (S15). The prober 300 may transmit a second test start signal to the prober 300 (S16a). In response to receipt of the second test start signal, the semiconductor wafer test apparatus 1000 conducts a second test (S16b). When the second test is complete, the semiconductor wafer test apparatus 1000 transmits a second test end signal to the prober 300 (S16c). The prober 300 unloads the second wafer (S17a) and then unloads the first lot (S17b) because all the wafers of the first lot have been tested.

After a lapse of a predetermined amount of idle time, the second lot is loaded in accordance with the predefined wafer test schedule, and the third wafer of the second lot is loaded and tested by the same method as the wafers of the first lot.

During a series of processes for testing of the first and second lots, the semiconductor wafer test system is maintained in a ready mode. The ready mode may refer to a state where all parts and elements of the semiconductor wafer test apparatus 1000 are powered on. When tests begin in the ready mode, the semiconductor wafer test system may be switched to a test mode.

However, even when idling without conducting tests, the semiconductor wafer test apparatus 1000 may be maintained in the ready mode and may thus consume a considerable amount of power to maintain connections between hardware devices and wait in a ready state.

In other words, the semiconductor wafer test apparatus 1000 may stand by in the state without conducting tests. When this standby is prolonged, the power consumption of the semiconductor wafer test apparatus 1000 may be reduced by cutting off the AC power of the semiconductor wafer test apparatus 1000, but there is a limit in manually cutting off the power for a large number of hardware devices of the semiconductor wafer test apparatus 1000.

SUMMARY

Aspects of the present disclosure provide a semiconductor wafer test system for controlling the supply of power to a semiconductor wafer test apparatus.

Aspects of the present disclosure also provide a semiconductor wafer test system capable of efficiently supplying power by switching the operating mode of a semiconductor wafer test apparatus to a waiting mode via a test operating server in accordance with a wafer test schedule.

Aspects of the present disclosure also provide a semiconductor wafer test system for automatically controlling the supply of power to a semiconductor wafer test apparatus based on the operating state of the semiconductor wafer test apparatus.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a semiconductor wafer test system may include: a test operating server managing a wafer test schedule and sending a request to switch to a waiting mode or to a ready mode to a semiconductor wafer test apparatus in accordance with the wafer test schedule; and the semiconductor wafer test apparatus switched to the waiting mode in response to receipt of the request to switch to the waiting mode from the test operating server and switched to the ready mode in response to receipt of the request to switch to the ready mode from the test operating server.

In some embodiments, the waiting mode may comprise an operating mode where the supply of power to hardware boards of the semiconductor wafer test apparatus, not power to essential devices of the semiconductor wafer test apparatus, is cut off, the essential devices may include a test management processor (TMP), a main frame interface board, and hardware boards of a common part of a tester head, and the hardware boards of the common part may include an algorithmic pattern generator (ALPG) board and a test head interface board.

In some embodiments, the test operating server may send the request to switch to the waiting mode when a first lot is unloaded, and may send the request to the ready mode before the loading of a second lot, and the semiconductor wafer test apparatus may be switched to the waiting mode in response to receipt of the request sent by the test operating server when the first lot is loaded, and may be switched to the ready mode in response to receipt of the request sent by the test operating server before the loading of the second lot.

In some embodiments, the test operating server may designate an idle time based on the wafer test schedule and may send a request to switch to the waiting mode during the idle time, and the semiconductor wafer test apparatus may be switched to the waiting mode during the idle time in response to receipt of the request to switch to the waiting mode during the idle time and may be automatically switched to the ready mode after a lapse of the idle time.

In some embodiments, the idle time may comprise the amount of time required for at least one of the maintenance of the semiconductor wafer test apparatus, the replacement of a probe card, and the change of a temperature condition for a wafer test.

In some embodiments, the idle time may comprise an interval between a start time of the unloading of a first lot and a scheduled start time of the loading of a second lot if the interval is equal to, or greater than, a reference value.

In some embodiments, the reference value may comprise an average waiting time of the semiconductor wafer test apparatus.

In some embodiments, if the idle time is extended due to a change in the wafer test schedule, the test operating server may send a request to extend a duration of the waiting mode to the semiconductor wafer test apparatus, and the semiconductor wafer test apparatus may be maintained in the waiting mode for the extended idle time in response to receipt of the request to extend the duration of the waiting mode.

In some embodiments, if the idle time is reduced due to a change in the wafer test schedule, the test operating server may send a request to cut short a duration of the waiting mode to the semiconductor wafer test apparatus, and the semiconductor wafer test apparatus may be maintained in the waiting mode for the reduced idle time in response to receipt of the request to cut short the duration of the waiting mode.

According to another aspect of the present disclosure, a method performed by a semiconductor wafer test apparatus may include: managing, by a test operating server, a wafer test schedule and sending a request to switch to a waiting mode or to a ready mode to the semiconductor wafer test apparatus in accordance with the wafer test schedule; and switching the semiconductor wafer test apparatus to the waiting mode in response to receipt of the request to switch to the waiting mode from the test operating server and switching the semiconductor wafer test apparatus to the ready mode in response to receipt of the request to switch to the ready mode from the test operating server.

In some embodiments, the waiting mode may comprise an operating mode where the supply of power to hardware boards of the semiconductor wafer test apparatus, but not power to essential devices of the semiconductor wafer test apparatus, is cut off, the essential devices may include a TMP, a main frame interface board, and hardware boards of a common part of a tester head, and the hardware boards of the common part may include an ALPG board and a test head interface board.

In some embodiments, the test operating server may send the request to switch to the waiting mode when a first lot is unloaded, and may send the request to the ready mode before the loading of a second lot, and the semiconductor wafer test apparatus may be switched to the waiting mode in response to receipt of the request sent by the test operating server when the first lot is loaded, and may be switched to the ready mode in response to receipt of the request sent by the test operating server before the loading of the second lot.

In some embodiments, the test operating server may designate an idle time based on the wafer test schedule and may send a request to switch to the waiting mode during the idle time, and the semiconductor wafer test apparatus may be switched to the waiting mode during the idle time in response to receipt of the request to switch to the waiting mode during the idle time and may be automatically switched to the ready mode after a lapse of the idle time.

In some embodiments, the idle time may comprise the amount of time required for at least one of the maintenance of the semiconductor wafer test apparatus, the replacement of a probe card, and the change of a temperature condition for a wafer test.

In some embodiments, an interval between a start time of the unloading of a first lot and a scheduled start time of the loading of a second lot may comprise set as the idle time if the interval is equal to, or greater than, a reference value.

In some embodiments, the reference value may comprise an average waiting time of the semiconductor wafer test apparatus.

In some embodiments, if the idle time is extended due to a change in the wafer test schedule, the test operating server may send a request to extend a duration of the waiting mode to the semiconductor wafer test apparatus, and the semiconductor wafer test apparatus may be maintained in the waiting mode for the extended idle time in response to receipt of the request to extend the duration of the waiting mode.

In some embodiments, if the idle time is reduced due to a change in the wafer test schedule, the test operating server may send a request to cut short a duration of the waiting mode to the semiconductor wafer test apparatus, and the semiconductor wafer test apparatus may be maintained in the waiting mode for the reduced idle time in response to receipt of the request to cut short the duration of the waiting mode.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Embodiments of the present disclosure will hereinafter be described in detail with reference to the accompanying drawings. Advantages and features of the present disclosure, and methods for achieving them, will be made clear from embodiments described below in detail with reference to the accompanying drawings. The present disclosure may, however, be embodied in many different forms, and should not be construed as being limited to the embodiments set forth herein. Rather, these embodiments are provided so that this disclosure will be thorough and complete, and will fully convey the scope of the disclosure to those skilled in the art. The present disclosure is defined only by the scope of the claims.

Descriptions of well-known features, elements, or functions that may obscure the subject matter of the present disclosure will be omitted.

Figure 3:
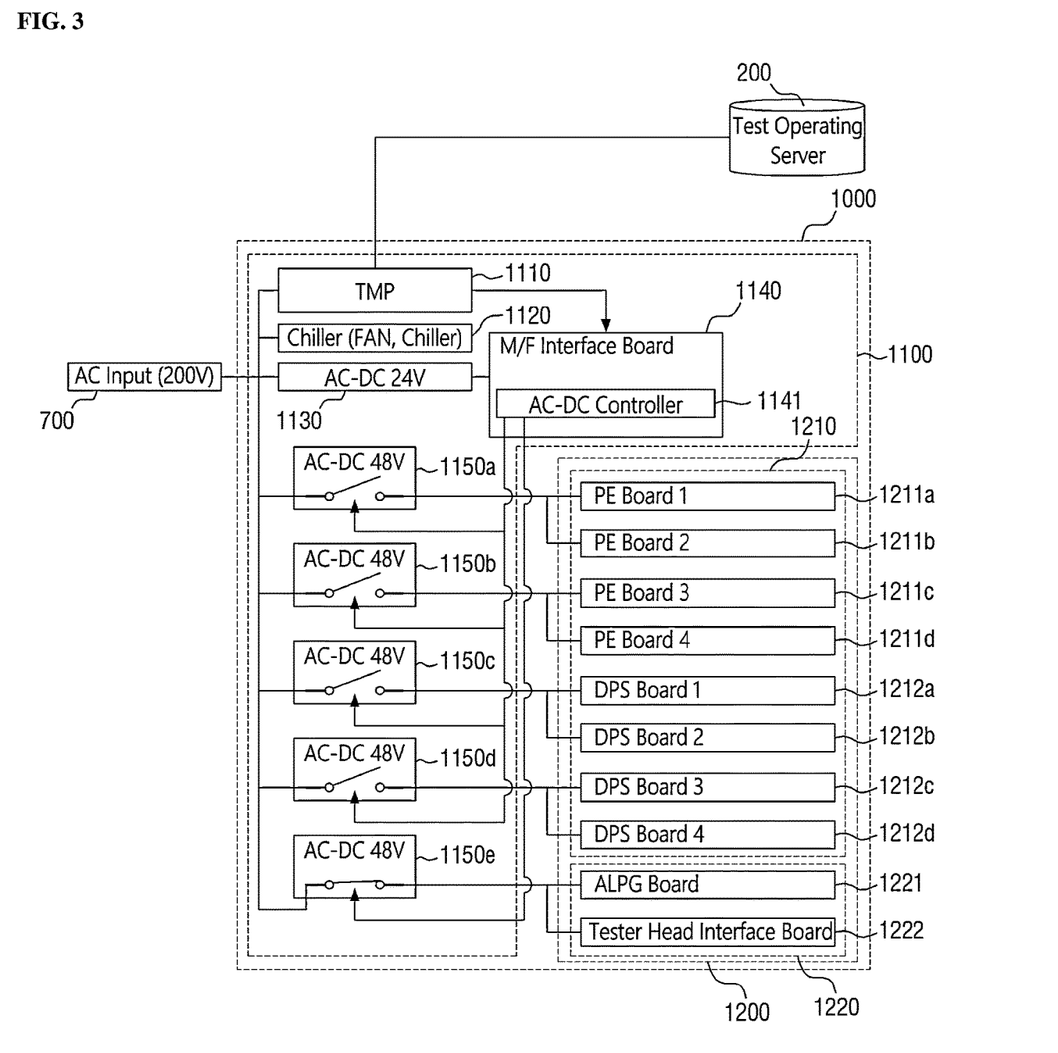
FIG. 3 is a hardware configuration view of a semiconductor wafer test system including a semiconductor wafer test apparatus, according to an embodiment of the present disclosure.

FIG. 3 is a hardware configuration view of a semiconductor wafer test system including a semiconductor wafer test apparatus, according to an embodiment of the present disclosure.

Referring to FIG. 3, the semiconductor wafer test system may include a semiconductor wafer test apparatus 1000, a test operating server 200, and an external power source 700. The semiconductor wafer test apparatus 1000 includes a main frame 1100 and a tester head 1200. The main frame 1100 may include a tester management processor (TMP) 1110 and a main frame (M/F) interface board 1140 and may further include a chiller 1120, a 24V alternating current (AC)-to-direct current (DC) converter 1130, and a plurality of 48V AC-to-DC converters 1150a through 1150e. The tester head 1200 may include a resource part 1210 and a common part 1220. The resource part 1210 may include a plurality of first through fourth pin electronics (PE) boards 1211a through 1211d and a plurality of first through fourth device power supply (DPS) boards 1212a through 1212d.

The common part 1220 may include an algorithmic pattern generator (ALPG) board 1221 and a tester head interface board 1222.

The elements of the semiconductor wafer test apparatus 1000 will hereinafter be described.

The TMP 1110 may be an internal computing device for controlling the semiconductor wafer test apparatus 1000. The TMP 1110 may include at least one processor, a bus, a communication interface, a memory, which loads a computer program executed by the processor, and a storage, which stores the computer program. Obviously, the TMP 1110 may further include other general-purpose elements other than those set forth herein.

The TMP 1110 may receive wafer test-related signals from the test operating server 200 or a prober 300. The wafer test-related signals may include, for example, a wafer load event signal, a wafer unload event signal, a mode switch request signal, a lot load event signal, and a lot unload event signal.

The chiller 1120 is a device controlling the generation of heat by the semiconductor wafer test apparatus 1000.

The AC-to-DC converters 1130 and 1150a through 1150e are devices converting AC voltages into stable DC voltages.

The AC-to-DC converter 1130, which is connected to the M/F interface board 1140, may convert AC voltages into 24 V DC voltages, and the AC-to-DC converters 1150a through 1150e, which are connected to the hardware boards of the tester head 1200, i.e., the first through fourth PE boards 1211a through 1211d, the first through fourth DPS boards 1212a through 1212d, the ALPG board 1221, and the tester head interface board 1222, may convert AC voltages into 48V DC voltages.

The M/F interface board 1140 may include an AC-to-DC controller 1141, which controls a power source for the hardware devices of the semiconductor wafer test apparatus 1000. The AC-to-DC controller 1141 may be, for example, a controller using a field-programmable gate array (FPGA).

The AC-to-DC controller 1141 may supply power to the hardware boards of the tester head 1200 upon request from the TMP 1110. Also, the AC-to-DC controller 1141 may cut off the supply of power to the hardware boards of the tester head 1200 upon request from the TMP 1110.

The resource part 1210 of the tester head 1200 transmits signals directly to semiconductor chips of a target wafer to be tested.

The first through fourth PE boards 1211a through 1211d of the resource part 1210 may apply input/output (I/O) signals for testing semiconductor chips. The number of PE boards of the resource part 1210 is not particularly limited, and additional PE boards may be further provided.

The first through fourth DPS boards 1212a through 1212d of the resource part 1210 may supply power for driving semiconductor chips. The number of DPS boards of the resource part 1210 is not particularly limited, and additional DPS boards may be further provided.

The common part 1220 of the tester head 1200 may include other hardware boards for a wafer test.

The ALPG board 1221 of the common part 1220 is a hardware board where patterns defined by a user for testing semiconductor chips are stored.

The tester head interface board 1222 of the common part 1220 may control main information regarding the tester head 1200 and peripheral devices in the tester head 1200.

The tester head 1200 may include various well-known processors for a semiconductor wafer test, in addition to the above-described hardware boards.

The test operating server 200 may manage processes performed by, and the schedule of, the semiconductor wafer test system.

The test operating server 200 may generally manage the operating mode of the target wafer, the maintenance of the semiconductor wafer test apparatus 1000, the replacement of a probe card 400, and the change of a temperature condition for a test.

The test operating server 200 may receive an event signal such as a wafer load or unload event signal or a lot load or unload event signal from the prober 300. The test operating server 200 may transmit the received event signal to the TMP 1110 of the semiconductor wafer test apparatus 1000.

The test operating server 200 may transmit a signal requesting a switch to a ready mode or a waiting mode to the TMP 1110 of the semiconductor wafer test apparatus 1000, and a request to switch to the ready mode or the waiting mode may be made based on the test schedule of the test operating server 200.

According to the embodiment of FIG. 3, the power consumption of the semiconductor wafer test system can be improved by switching the semiconductor wafer test system to a ready mode or a waiting mode based on the operation plan of the semiconductor wafer test apparatus 1000 to efficiently supply power to the semiconductor wafer test apparatus 1000.

Figure 4:
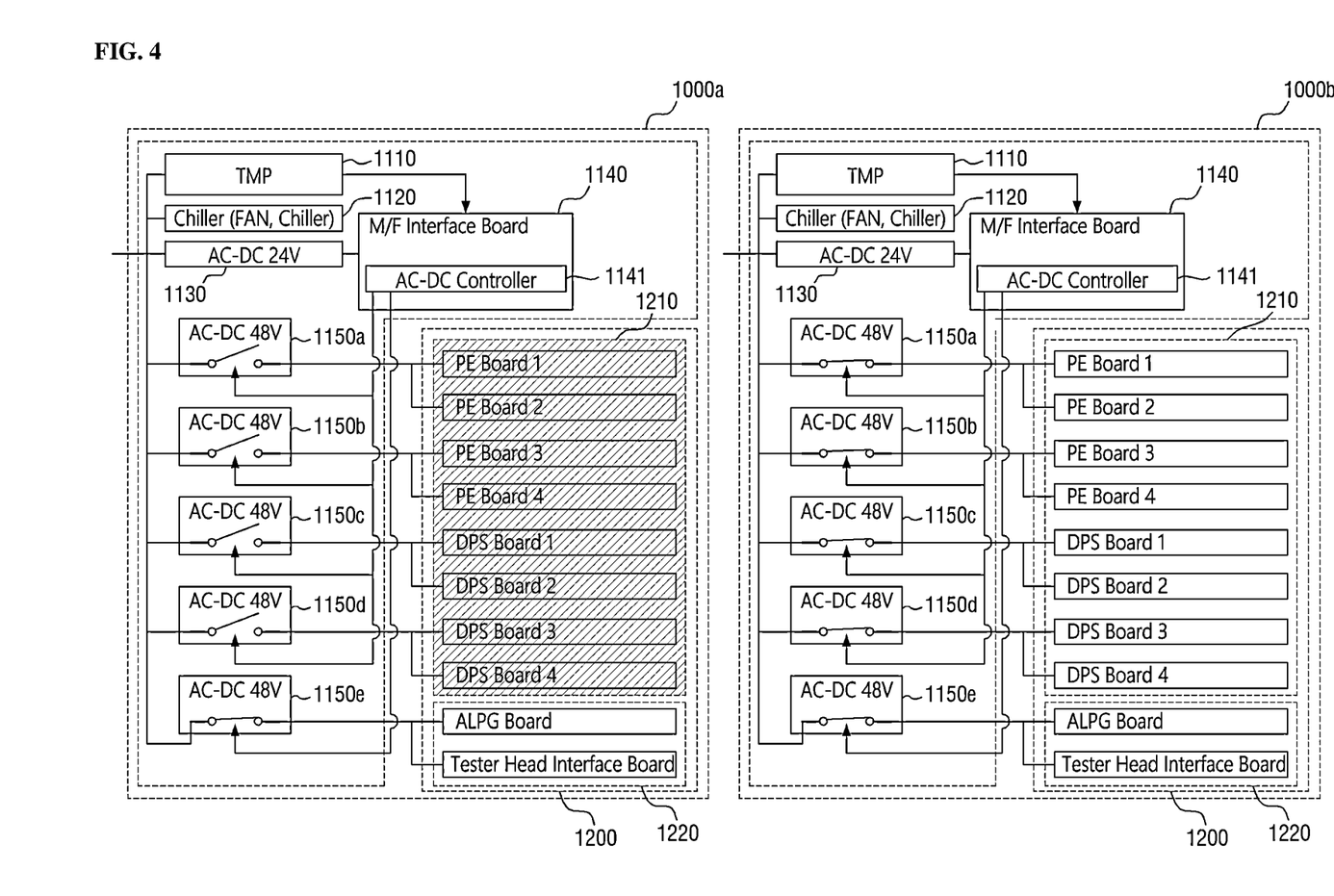
FIG. 4 is a hardware configuration view illustrating how to supply power in accordance with the operating mode of a semiconductor wafer test apparatus, according to an embodiment of the present disclosure.

FIG. 4 is a hardware configuration view illustrating how to supply power in accordance with the operating mode of a semiconductor wafer test apparatus, according to an embodiment of the present disclosure.

The operating mode of a semiconductor wafer test apparatus may be classified into a waiting mode, a ready mode, or a test mode, and when a wafer test begins, a semiconductor wafer test system including the semiconductor wafer test apparatus is switched from the ready mode to the test mode.

Referring to FIG. 4, reference numeral 1000a refers to a semiconductor wafer test apparatus in the waiting mode. In the waiting mode, the supply of DC power to the entire semiconductor wafer test apparatus 1000a except for essential devices, i.e., the supply of DC power to the PE boards and DPS boards of a resource part 1210, may be cut off. Here, the essential devices of the semiconductor wafer test apparatus 1000a may include a TMP 1110 and an M/F interface board 1140 and may further include a chiller 1120.

The hardware boards of a common part 1220 of the semiconductor wafer test apparatus 1000a may be additional essential devices and may be supplied with power even in the waiting mode. The hardware boards of the common part 122 may include an ALPG board and a tester head interface board.

When the semiconductor wafer test system is switched from the ready mode to the waiting mode, an AC-to-DC controller 1141 of the semiconductor wafer test apparatus 1000a may control the supply of power to the hardware boards of a tester head 1200 of the semiconductor wafer test apparatus 1000a upon request from the TMP 1110. For example, when the semiconductor wafer test system is switched to the waiting mode, the AC-to-DC controller 1141 may cut off the supply of power to 48V AC-to-DC converters 1150a through 1150d, which are connected to the resource part 1210, and may supply power to a 48V AC-to-DC converter 1150e, which is connected to the common part 1220.

The ready mode may be a mode where all hardware devices of the semiconductor wafer test apparatus 1000a that are driven by AC power are powered on and only some of hardware devices of the semiconductor wafer test apparatus 1000a that are driven by DC power are powered on.

Reference numeral 1000b refers to a semiconductor wafer test apparatus in the ready mode. In the ready mode, power is supplied to all the hardware devices of the semiconductor wafer test apparatus 1000b, including the PE boards and the DPS boards of a resource part 1210.

When the semiconductor wafer test system is switched from the waiting mode to the ready mode, an AC-to-DC controller 1141 of the semiconductor wafer test apparatus 1000b may control the supply of power to the hardware boards of a tester head 1200 of the semiconductor wafer test apparatus 1000b upon request from a TMP 1110 of the semiconductor wafer test apparatus 1000b. For example, when the semiconductor wafer test system is switched to the ready mode, the AC-to-DC controller 1141 may supply power to 48V AC-to-DC converters 1150a through 1150d of the semiconductor wafer test apparatus 1000b, which are connected to the resource part 1210, and to a 48V AC-to-DC converter 1150e of the semiconductor wafer test apparatus 1000b, which is connected to the common part 1220.

Then, when a wafer is loaded and a test start signal is transmitted to the semiconductor wafer test apparatus 1000b, the semiconductor wafer test system may be switched from the ready mode to the test mode, and a wafer test may be conducted. During the wafer test, power may be continuously supplied to the same hardware devices as those that are powered on in the ready mode, and the power consumption of the semiconductor wafer test apparatus 1000b may increase.

The waiting mode may refer to an idle mode, and the ready mode may refer to a standby mode. The idle mode may correspond to a state where the TMP 1110 and an M/F interface board 1140 of the semiconductor wafer test apparatus 1000b are powered on, and the standby mode may correspond to a state where all the hardware devices of the semiconductor wafer test apparatus 1000b required for conducting a wafer test are powered on.

The idle mode may correspond to a state where a test program for changing the conditions of a wafer test can be complied, and the standby mode may correspond to a state where the semiconductor wafer test system is ready to conduct a wafer test.

According to the embodiment of FIG. 4, the power consumption of the semiconductor wafer test system can be improved by cutting off the supply of power to the non-essential hardware devices of the semiconductor wafer test apparatus 1000a or 1000b in accordance with the operation plan of the semiconductor wafer test apparatus 1000a or 1000b when not conducting a wafer test for more than a predetermined amount of time.

Also, the power consumption of the semiconductor wafer test system can be improved by cutting off the supply of power to some of the hardware devices of the semiconductor wafer test apparatus 1000a or 1000b that are driven by DC power, when not conducting a wafer test.

Methods of supplying power in response to the operating mode of a semiconductor wafer test apparatus being switched by a test operating server, according to some embodiments of the present disclosure, will hereinafter be described with reference to FIGS. 5 and 6.

Figure 5:
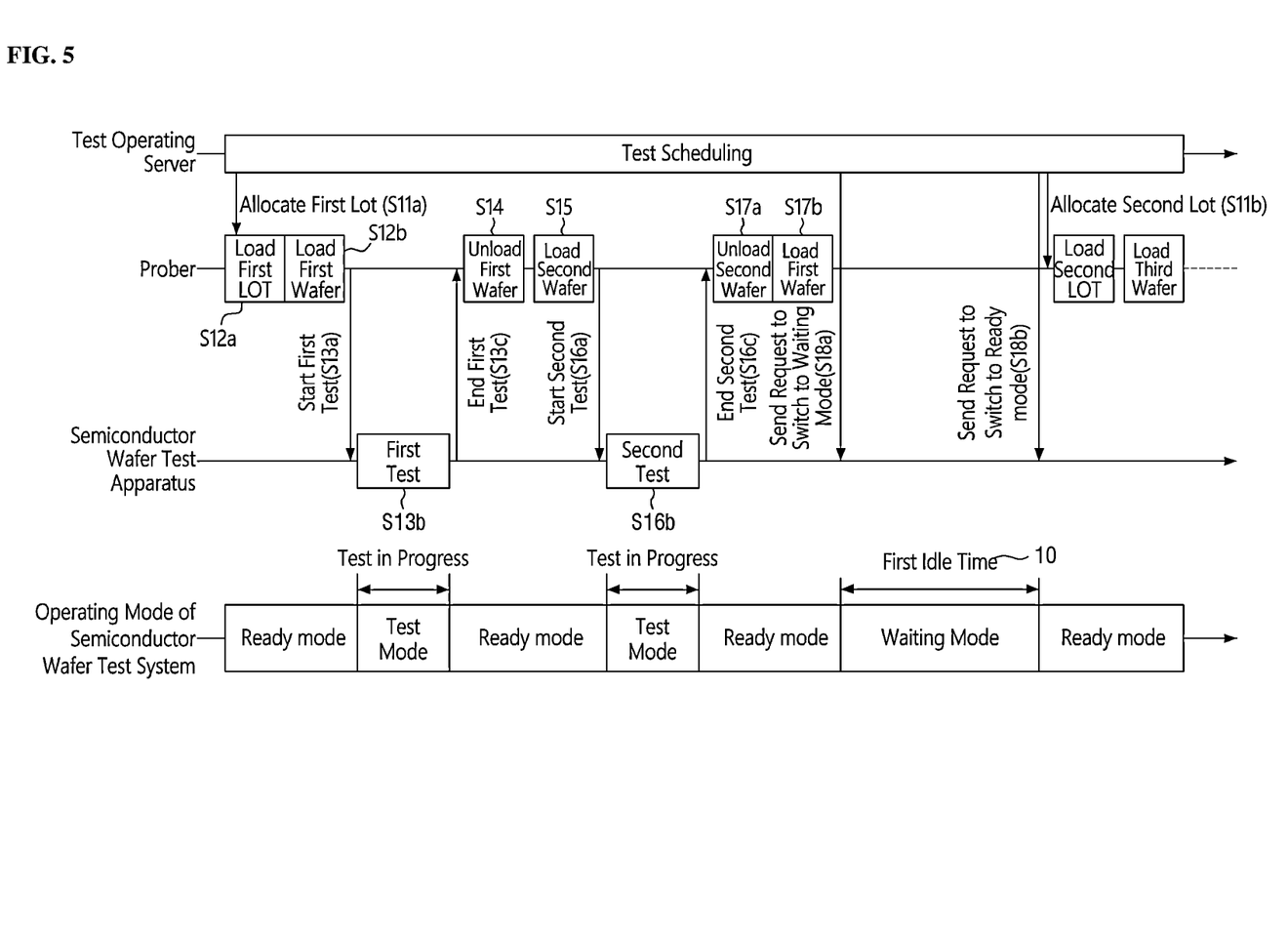
FIG. 5 is a flowchart illustrating a method of supplying power in response to the operating mode of a semiconductor wafer test apparatus being switched by a test operating server, according to an embodiment of the present disclosure.

FIG. 5 is a flowchart illustrating how to switch the operating mode of the semiconductor wafer test apparatus 1000 upon request from the test operating server 200, according to an embodiment of the present disclosure.

Referring to FIG. 5, the test operating server 200 sequentially allocates lots to the prober 300 in accordance with a predetermined wafer test schedule. For example, the test operating server 200 may allocate first and second lots to the prober 300 (S11a and S11b).

Thereafter, when a first wafer of the first lot is loaded by the prober 300, a first test start signal may be transmitted from the prober 300 to the semiconductor wafer test apparatus 1000 (S13a). In response to receipt of the first test start signal, the semiconductor wafer test apparatus 1000 conducts a first test (S13b). When the first test begins, the operating mode of the semiconductor wafer test system is switched from the ready mode to the test mode. When the first test is complete, the operating mode of the semiconductor wafer test system is switched from the test mode to the ready mode, and the semiconductor wafer test apparatus 1000 transmits a first test end signal to the prober 300 (S13c). In response to receipt of the first test end signal, the prober 300 unloads the first wafer (S14) and then readily loads a second wafer of the first lot (S15). Thereafter, the prober 300 may transmit a second test start signal to the semiconductor wafer test apparatus 1000 (S16a). In response to receipt of the second test start signal, the semiconductor wafer test apparatus 1000 conducts a second test (S16b). When the second test begins, the operating mode of the semiconductor wafer test system is switched from the ready mode to the test mode. When the second test is complete, the operating mode of the semiconductor wafer test system is switched from the test mode to the ready mode, and the semiconductor wafer test apparatus 1000 transmits a second test end signal to the prober 300 (S16c). Then, the prober 300 unloads the second wafer (17a) and unloads the first lot (S17b) because all the wafers of the first lot have been tested.

Thereafter, the test operating server 200 may transmit a waiting mode switch request signal to the semiconductor wafer test apparatus 1000 (S18a). Then, the semiconductor wafer test system may be switched to the waiting mode.

As the TMP 1110 of the semiconductor wafer test apparatus 1000 receives a request to switch to the waiting mode from the test operating server 200, the semiconductor wafer test system is switched to the waiting mode. Then, the supply of power to the hardware boards of the resource part 1210 may be remotely cut off. Specifically, the TMP 1110 may transmit a waiting mode switch signal to the M/F interface board 1140, and a board controller of the M/F interface board 1140 may cut off the supply of power to the hardware boards of the resource part 1210.

The supply of DC power to the hardware boards of the resource part 1210 may be cut off by the AC-to-DC controller 1141 of the M/F interface board 1140.

The hardware boards of the resource part 1210 that are cut off from the supply of power may include the first through fourth PE boards 1211a through 1211d and the first through DPS boards 1212a through 1212d.

As the semiconductor wafer test system is switched to the waiting mode, the effect of automatically cutting off the supply of power to multiple hardware devices of the semiconductor wafer test apparatus 1000 remotely can be achieved by the board controller of the M/F interface board 1140, without having to manually cut off the power of the multiple hardware devices.

A first idle time 10 after the semiconductor wafer test system is switched to the waiting mode, the test operating server 200 may transmit a ready mode switch request signal to the semiconductor wafer test apparatus 1000 (S18b).

Here, the first idle time 10 may be the amount of time required for the maintenance of the semiconductor wafer test apparatus 1000, the replacement of the probe card 400, or the change of the temperature for a wafer test.

The amount of time required for the change of the temperature for a wafer test may be the amount of time required to change the temperature condition for the test of the wafers of the second lot, depending on the type of wafers of the second lot, when the test of the wafers of the first lot is complete.

When the semiconductor wafer test system is switched to the ready mode, power may be remotely supplied to the hardware boards of the resource part 1210 by the AC-to-DC controller 1141 of the M/F interface board 1140 in the same manner as described above. Thereafter, the second lot is loaded in accordance with the predetermined wafer test schedule, and a third wafer of the second lot is loaded and tested by the same method as the wafers of the first lot.

In the embodiment of FIG. 5, the hardware boards of the resource part 1210 that are supplied with power may include the first through fourth PE boards 1211a through 1211d and the first through DPS boards 1212a through 1212d.

Figure 6:
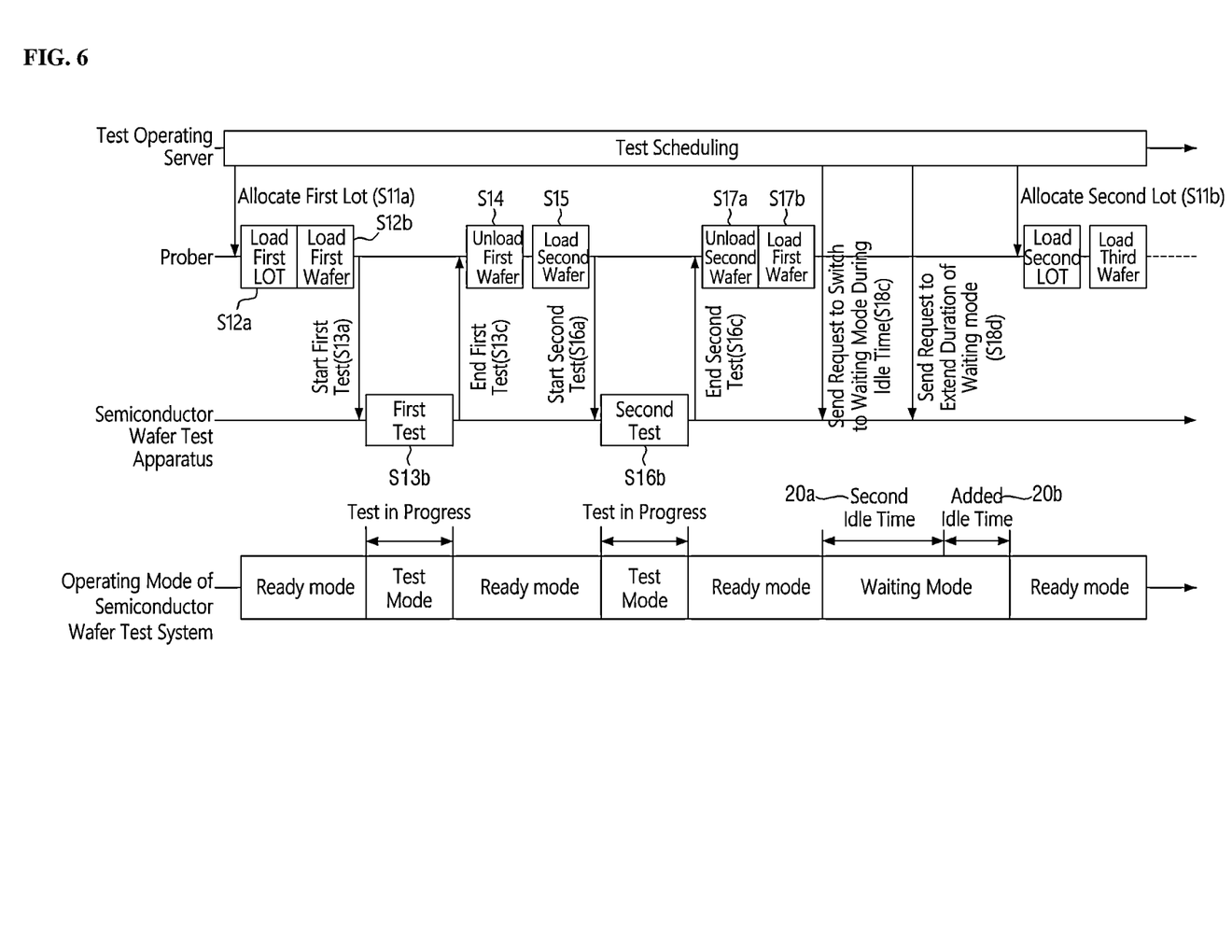
FIG. 6 is a flowchart illustrating a method of supplying power in response to the operating mode of a semiconductor wafer test apparatus being switched by a test operating server, according to another embodiment of the present disclosure.

FIG. 6 is a flowchart illustrating how to switch the operating mode of the semiconductor wafer test apparatus 1000 for a predetermined amount of time upon request from the test operating server 200.

Referring to FIG. 6, steps ranging from S11a to S17b are the same as their respective counterparts of FIG. 5.

After the unloading of a first lot (S17b), the test operating server 200 may transmit a signal requesting the semiconductor wafer test apparatus 1000 to switch the operating mode of the semiconductor wafer test system to the waiting mode for a predetermined amount of idle time to the semiconductor wafer test apparatus 1000 (S18c). Then, the semiconductor wafer test apparatus 1000 may switch the operating mode of the semiconductor wafer test system to the waiting mode for a second idle time 20a.

According to the embodiment of FIG. 6, as the semiconductor wafer test apparatus 1000 is switched to the waiting mode for a predetermined amount of time and is then automatically switched to the ready mode, the effect of automatically switching the semiconductor wafer test apparatus 1000 to the ready mode can be achieved even when a ready mode switch request signal is not received due to error of the test operating server 200.

Here, the second idle time 20a may be the amount of time required for the maintenance of the semiconductor wafer test apparatus 1000, the replacement of the probe card 400, and the change of the temperature for a wafer test. For example, the second idle time 20a may be the sum of the amount of time required for the maintenance of the semiconductor wafer test apparatus 1000 and the amount of time required for the replacement of the probe card 400, but the present disclosure is not limited thereto. That is, the second idle time 20a may include the amounts of time required to perform various processes for the preparation of a wafer test.

The amount of time required for the change of the temperature for a wafer test may be the amount of time required to change the temperature condition for the test of the wafers of a second lot, depending on the type of wafers of the second lot, when the test of the wafers of the first lot is complete.

The interval between the start time of the unloading of the first lot and the scheduled start time of the loading of the second lot may be set as the second idle time 20a if the interval is equal to, or greater than, a reference value. For example, if the interval between the actual start time of the unloading of the first lot and the scheduled start time of the loading of the second lot is less than the reference value, the test operating server 200 may not transmit a waiting mode switch request signal to the semiconductor wafer test apparatus 1000, and the semiconductor wafer test system may be maintained in the ready mode.

Alternatively, the interval between the start time of the unloading of the first wafer and the scheduled start time of the loading of the second wafer may be set as the second idle time 20a if the interval is equal to, or greater than, a reference value. For example, the reference value may be an average waiting time of the semiconductor wafer test apparatus 1000.

As the test operating server 200 calculates a waiting time, during which tests are not conducted, based on a predefined wafer test schedule, determines whether to switch the operating mode of the semiconductor wafer test system, and automatically switches the operating mode of the semiconductor wafer test system after a lapse of the waiting time, the power consumption of the semiconductor wafer test apparatus 1000 can be improved.

Thereafter, if the predefined wafer test schedule is delayed when the semiconductor wafer test system is switched to the waiting mode in response to the request to switch to the waiting mode being sent from the test operating server 200 to the semiconductor wafer test apparatus 1000 (S18c), the test operating server 200 may send a request to extend the duration of the waiting mode to the semiconductor wafer test apparatus 1000 (S18d). In this case, the duration of the waiting mode may be extended by as much as an additional idle time 20b.

On the contrary, if the predefined wafer test schedule is advanced, the test operating server 200 may send a request to cut short the duration of the waiting mode to the semiconductor wafer test apparatus 1000. In this case, the duration of the waiting mode may be cut short by as much as a predetermined amount of time.

After a lapse of the original second idle time 20a or an extended or reduced second idle time 20a in accordance with a change in the predefined wafer test schedule, the TMP 1110 of the semiconductor wafer test apparatus 1000 may transmit a power supply signal to the board controller of the M/F interface board 1140 so that power may be automatically supplied to the hardware boards of the resource part 1210. Thereafter, the second lot is loaded in accordance with the predefined wafer test schedule, and a third wafer of the second lot is loaded and tested by the same method as the wafers of the first lot.

According to the embodiment of FIG. 6, even if the predefined wafer test schedule is changed, power can be efficiently supplied to the semiconductor wafer test apparatus 1000 by extending or cutting short the waiting mode for the semiconductor wafer test system.

A method (or operation) of controlling the supply of power to the semiconductor wafer test apparatus 1000 may be realized.

The method may include: managing, by the test operating server 200, which is included in the semiconductor wafer test apparatus 1000, a wafer test schedule and sending a request to switch to the waiting mode or to the ready mode in accordance with the wafer test schedule; in response to receipt of the request to switch to the waiting mode from the test operating server 200, switching the semiconductor wafer test apparatus 1000 to the ready mode; and in response to receipt of the request to switch to the ready mode from the test operating server 200, switching the semiconductor wafer test apparatus 1000 to the ready mode.

The test operating server 200 may send the request to switch to the waiting mode when a first lot is unloaded, and may send the request to switch to the ready mode before the loading of a second lot, and the semiconductor wafer test apparatus 1000 may be switched to the waiting mode in response to receipt of the request sent by the test operating server 200 when the first lot is loaded, and may be switched to the ready mode in response to receipt of the request sent by the test operating server 200 before the loading of the second lot.

In some embodiments, the test operating server 200 may designate an idle time based on the wafer test schedule and may send a request to switch to the waiting mode during the idle time, and the semiconductor wafer test apparatus 1000 may be switched to the waiting mode during the idle time in response to receipt of the request to switch to the waiting mode during the idle time and may be automatically switched to the ready mode after a lapse of the idle time.

If the idle time is extended or reduced due to a change in the wafer test schedule, the test operating server 200 may send a request to extend or cut short the duration of the waiting mode to the semiconductor wafer test apparatus 1000, and the semiconductor wafer test apparatus 1000 may be maintained in the waiting mode for the extended or reduced idle time in response to receipt of the request to extend or cut short the duration of the waiting mode.

Embodiments of the present disclosure have been described above with reference to the accompanying drawings, but the present disclosure is not limited thereto. It should be noted that the effects of the present disclosure are not limited to those described above, and other effects of the present disclosure will be apparent from the following description.

The technical concept of the present disclosure may be implemented as computer-readable code on a computer-readable medium. The computer-readable code may be transmitted to computing devices over a network such as the Internet and may then be installed and used in the computing devices.

While operations are depicted in the accompanying drawings in a particular order, they should not be understood as being performed only in that particular order or in any sequential order or as all having to be performed, to achieve desirable results. In certain circumstances, multitasking and parallel processing may be advantageous. Embodiments of the present disclosure have been described above with reference to the accompanying drawings, but the present disclosure is not limited thereto and may be implemented in various different forms. It will be understood that the present disclosure can be implemented in other specific forms without changing the technical spirit or gist of the present disclosure. Therefore, it should be understood that the embodiments set forth herein are illustrative in all respects and not limiting.

What is claimed is:

1. A semiconductor wafer test system comprising:
    a test operating server configured to manage a wafer test schedule and send a request to switch to a waiting mode or to a ready mode to a semiconductor wafer test apparatus in accordance with the wafer test schedule; and
    the semiconductor wafer test apparatus configured to switch to the waiting mode in response to receipt of the request to switch to the waiting mode from the test operating server and configured to switch to the ready mode in response to receipt of the request to switch to the ready mode from the test operating server, wherein the test operating server is configured to send the request to switch to the waiting mode when a first lot of wafers to be tested is unloaded, and send the request to switch to the ready mode before loading of a second lot of wafers to be tested.

2. The semiconductor wafer test system of claim 1, wherein
in the waiting mode, a supply of power to first hardware boards of the semiconductor wafer test apparatus is cut off, and a power to essential devices of the semiconductor wafer test apparatus is maintained,
the essential devices include a test management processor (TMP), a main frame interface board, and second hardware boards of a tester head, and
the second hardware boards include an algorithmic pattern generator (ALPG) board and a test head interface board.

3. The semiconductor wafer test system of claim 1, wherein
the semiconductor wafer test apparatus is further configured to switch to the waiting mode in response to the receipt of the request to switch sent by the test operating server when the first lot of wafers is loaded, and is further configured to switch to the ready mode in response to the receipt of the request to switch sent by the test operating server before the loading of the second lot of wafers.

4. The semiconductor wafer test system of claim 1, wherein
the test operating server is configured to designate an idle time based on the wafer test schedule and send the request to switch to the waiting mode during the idle time, and
the semiconductor wafer test apparatus is configured to switch to the waiting mode during the idle time in response to the receipt of the request to switch to the waiting mode during the idle time and is configured to automatically switch to the ready mode after a lapse of the idle time.

5. The semiconductor wafer test system of claim 4, wherein the idle time is an amount of time required for at least one of a maintenance of the semiconductor wafer test apparatus, a replacement of a probe card, and a change of a temperature condition for a wafer test.

6. The semiconductor wafer test system of claim 4, wherein the idle time is an interval between a start time of unloading of the first lot of wafers and a scheduled start time of the loading of the second lot of wafers in response to the interval being equal to or greater than a reference value.

7. The semiconductor wafer test system of claim 6, wherein the reference value is an average waiting time of the semiconductor wafer test apparatus.

8. The semiconductor wafer test system of claim 4, wherein
in response to the idle time being extended due to a change in the wafer test schedule, the test operating server is configured to send a request to extend a duration of the waiting mode to the semiconductor wafer test apparatus, and
the semiconductor wafer test apparatus is configured to be maintained in the waiting mode for an extended idle time in response to receipt of the request to extend the duration of the waiting mode.

9. The semiconductor wafer test system of claim 4, wherein
in response to the idle time being reduced due to a change in the wafer test schedule, the test operating server is configured to send a request to shorten a duration of the waiting mode to the semiconductor wafer test apparatus, and the semiconductor wafer test apparatus is configured to be maintained in the waiting mode for a reduced idle time in response to receipt of the request to shorten the duration of the waiting mode.

10. A method performed by a semiconductor wafer test apparatus, the method comprising:
managing, by a test operating server, a wafer test schedule and sending a request to switch to a waiting mode or to a ready mode to the semiconductor wafer test apparatus in accordance with the wafer test schedule; and
switching the semiconductor wafer test apparatus to the waiting mode in response to receipt of the request to switch to the waiting mode from the test operating server and switching the semiconductor wafer test apparatus to the ready mode in response to receipt of the request to switch to the ready mode from the test operating server, wherein
the test operating server is configured to send the request to switch to the waiting mode when a first lot of wafers to be tested is unloaded, and send the request to switch to the ready mode before loading of a second lot of wafers to be tested.

11. The method of claim 10, wherein
in the waiting mode, a supply of power to first hardware boards of the semiconductor wafer test apparatus is cut off, and a power to essential devices of the semiconductor wafer test apparatus is maintained,
the essential devices include a test management processor (TMP), a main frame interface board, and second hardware boards of a tester head, and
the second hardware boards include an algorithmic pattern generator (ALPG) board and a test head interface board.

12. The method of claim 10, wherein
the semiconductor wafer test apparatus is further configured to switch to the waiting mode in response to receipt of the request to switch sent by the test operating server when the first lot of wafers is loaded, and is further configured to switch to the ready mode in response to receipt of the request to switch sent by the test operating server before the loading of the second lot of wafers.

13. The method of claim 10, wherein
the test operating server is configured to designate an idle time based on the wafer test schedule and send a request to switch to the waiting mode during the idle time, and
the semiconductor wafer test apparatus is configured to switch to the waiting mode during the idle time in response to receipt of the request to switch to the waiting mode during the idle time and is configured to automatically switch to the ready mode after a lapse of the idle time.

14. The method of claim 13, wherein the idle time is an amount of time required for at least one of a maintenance of the semiconductor wafer test apparatus, a replacement of a probe card, and a change of a temperature condition for a wafer test.

15. The method of claim 14, wherein
in response to the idle time being reduced due to a change in the wafer test schedule, the test operating server is configured send a request to shorten a duration of the waiting mode to the semiconductor wafer test apparatus, and the semiconductor wafer test apparatus is configured to be maintained in the waiting mode for a reduced idle time in response to receipt of the request to shorten the duration of the waiting mode.

16. The method of claim 13, wherein an interval between a start time of unloading of the first lot of wafers and a scheduled start time of the loading of the second lot of wafers is set as the idle time in response to the interval being equal to or greater than a reference value.

17. The method of claim 16, wherein the reference value is an average waiting time of the semiconductor wafer test apparatus.

18. The method of claim 13, wherein in response to the idle time being extended due to a change in the wafer test schedule, the test operating server is configured to send a request to extend a duration of the waiting mode to the semiconductor wafer test apparatus, and the semiconductor wafer test apparatus is configured to be maintained in the waiting mode for an extended idle time in response to receipt of the request to extend the duration of the waiting mode.

* * * * *